(12) United States Patent
Yang

(10) Patent No.: US 9,353,899 B2
(45) Date of Patent: May 31, 2016

(54) WATER HAMMER RECOGNIZING AND ENERGY SAVING WATER HAMMER PREVENTION SYSTEM AND METHOD FOR CONTROLLING THE SAME

(71) Applicant: SMTECH CO., LTD., Bucheon-si, Gyeonggi-do (KR)

(72) Inventor: Chulsu Yang, Bucheon-si (KR)

(73) Assignee: SM TECH CO., LTD., Bucheon-Si, Gyeonggi-Do (KR)

( * ) Notice: Subject to any disclaimer, the term of this patent is extended or adjusted under 35 U.S.C. 154(b) by 202 days.

(21) Appl. No.: 14/237,802

(22) PCT Filed: Mar. 25, 2013

(86) PCT No.: PCT/KR2013/002436
§ 371 (c)(1),
(2) Date: Feb. 7, 2014

(87) PCT Pub. No.: WO2013/172545
PCT Pub. Date: Nov. 21, 2013

(65) Prior Publication Data
US 2014/0166115 A1    Jun. 19, 2014

(30) Foreign Application Priority Data

May 15, 2012    (KR) ........................ 10-2012-0051641

(51) Int. Cl.
*F16L 55/045*    (2006.01)
*G05D 7/06*    (2006.01)
(Continued)

(52) U.S. Cl.
CPC ............ *F16L 55/045* (2013.01); *G05D 7/0682* (2013.01); *G05D 16/2073* (2013.01); *G05D 19/02* (2013.01); *F16L 55/053* (2013.01); *Y10T 137/0379* (2015.04); *Y10T 137/3331* (2015.04)

(58) Field of Classification Search
CPC ..... F16L 55/052; F16L 55/053; F16L 55/054; F16L 55/045; Y10T 137/0379; Y10T 137/3143; Y10T 137/3146; Y10T 137/7303; Y10T 137/87169; Y10T 137/86002; Y10T 137/86035; Y10T 137/86043; Y10T 137/86051; Y10T 137/86236; Y10T 137/3331; G05D 7/0682; G05D 16/2073; G05D 19/02
USPC ............. 137/12, 213, 214, 391, 596, 565.13, 137/565.17, 565.34, 565.18, 577; 417/540
See application file for complete search history.

(56) References Cited

U.S. PATENT DOCUMENTS 3,669,150 A * 6/1972 Everett .................... F16L 41/02
                                                                     137/207
4,088,154 A * 5/1978 Patton ..................... E21B 21/08
                                                                     137/207
(Continued)

FOREIGN PATENT DOCUMENTS

KR    1020010073604 A    8/2001
KR        100742398 B1    7/2007
(Continued)

OTHER PUBLICATIONS

International Search Report mailed Jul. 29, 2013 for PCT/KR2013/002436.

(Continued)

*Primary Examiner* — William McCalister
(74) *Attorney, Agent, or Firm* — Hauptman Ham, LLP

(57) ABSTRACT

The present invention relates to a water hammer recognizing and energy saving water hammer prevention system and a method for controlling the same that is configured wherein in case of the selective on/off operations of a plurality of pumps in a pipe system in accordance with the change of the use environment, the pressure variation and level variation of an air chamber caused by water hammer are compared with reference values and set values, and they are divided into a normal mode and a safe mode, thereby controlling the air intake and exhaust of the air chamber and preventing energy consumption from unnecessarily occurring.

3 Claims, 3 Drawing Sheets

(51) Int. Cl.
*G05D 16/20* (2006.01)
*G05D 19/02* (2006.01)
*F16L 55/053* (2006.01)

(56) References Cited

U.S. PATENT DOCUMENTS

| | | | | |
|---|---|---|---|---|
| 4,304,526 A | * | 12/1981 | Shetler, Sr. | F04B 49/022 417/38 |
| 5,320,495 A | * | 6/1994 | Ralph | F04B 49/022 285/89 |
| 6,089,837 A | * | 7/2000 | Cornell | F04B 11/00 138/26 |
| 2005/0089428 A1 | * | 4/2005 | Navarro | F16L 55/052 417/540 |
| 2005/0241697 A1 | * | 11/2005 | Ohmi | F16K 47/02 137/487.5 |
| 2011/0005630 A1 | * | 1/2011 | Al-Khomairi | F16L 55/052 138/30 |

FOREIGN PATENT DOCUMENTS

| KR | 1020070082615 A | 8/2007 |
|---|---|---|
| KR | 100868908 B1 | 11/2008 |
| KR | 100933656 B1 | 12/2009 |
| KR | 100982683 B1 | 9/2010 |
| KR | 1020110018041 A | 2/2011 |
| KR | 2020110006489 U | 6/2011 |

OTHER PUBLICATIONS

Korean Decision of Patent mailed Oct. 31, 2012 for application No. 10-2012-0051641.

* cited by examiner

WATER HAMMER RECOGNIZING AND ENERGY SAVING WATER HAMMER PREVENTION SYSTEM AND METHOD FOR CONTROLLING THE SAME

CROSS REFERENCE TO RELATED APPLICATION

This application claims the priority of Korean Patent Application No. 10-2012-0051641 filed on May 15, 2012 in the KIPO (Korean Intellectual Property Office). Further, this application is the National Phase application of International Application No. PCT/KR2013/002436 filed Mar. 25, 2013, which designates the United States and was published in Korean.

TECHNICAL FIELD

The present invention relates to a water hammer prevention system for preventing water hammer occurring in a pipe, and more particularly, to a water hammer recognizing and energy saving water hammer prevention system and a method for controlling the same that is configured wherein in case of the selective on/off operations of a plurality of pumps in a pipe system in accordance with the change of the use environment, the pressure variation and level variation of an air chamber caused by water hammer are compared with reference values and set values, and they are divided into a normal mode and a safe mode, thereby controlling the air intake and exhaust of the air chamber and preventing energy consumption from unnecessarily occurring.

BACKGROUND ART

If passage resistance during fluid flow is changed, the pressure of the fluid is changed. In case of a compressible fluid, that is, gas, the variation of the passage resistance just causes pressure variation, but in case of an incompressible fluid, that is, liquid, a water head itself is changed. That is, if the flux of the fluid flowing in a pipe is changed by the drastic opening/closing of a valve or the on/off operations of pumps, pressure variation momentarily occurs, which is called 'water hammer'. A water hammer wave generated from the water hammer is reciprocated along the pipe to generate noise and vibration, which is transmitted to neighboring structures (pumps, valves, etc.) through the pipe, thereby causing them to be seriously damaged.

As the flux of fluid becomes rapid and the change time of flux becomes short, the water hammer is increased. At this time, the negative pressure is under a saturated vapor pressure of water, thereby forming vapor cavity to cause the water column separation or the collapse of the pipe.

Generally, the flow of fluid in a pipe is largely divided into steady flow that is constantly maintained, irrespective of time, and unsteady flow that is changed in accordance with time, and in this case, the unsteady flow is subdivided into quasi-steady flow wherein the inertia or elasticity of fluid does not give any influence on the movement of the fluid in the pipe and unsteady flow wherein the inertia or elasticity of fluid gives an influence on the movement of the fluid in the pipe.

At this time, the water hammer has a relation with the unsteady flow wherein the inertial effect of the fluid is important and the compressibility effect of the pipe and fluid is very low or does not exist almost, which means rigid-column flow.

The water hammer necessarily occurs during the operation of the system, and so as to reduce the damage caused by the water hammer to a maximum degree, the following five rules should be observed:

Firstly, the momentary change of the flux of fluid through drastic manipulations of a valve and operation/stop manipulations of pumps should be prevented (the prevention of momentary change of flux);

Secondly, the valve and pumps are frequently checked and controlled so as to prevent the increased pressure caused by the water hammer from being raised more than the internal pressure of a system (maintaining the increased pressure below the internal pressure of a system);

Thirdly, if pressure is lowered below the saturated vapor pressure of a fluid, the fluid is changed from the liquid state into a gas state, thereby causing given problems, and accordingly, the pressure variation is noted during air bubbles are generated and disappear to control negative pressure (the prevention of the generation of negative pressure);

Fourthly, in even case where air is introduced into a pipe, if an amount of air introduced is not large and an appropriate flux exist, no problem occurs in the pipe system, but if an amount of air introduced is large and the air exhaust operation is not gentle in the pipe system, the air stays in the pipe, which causes many problems such as the unnecessary consumption of power, the reduction of flow rate, the generation of noise, corrosion and the like (the suppression of the introduction of air into pipe); and Lastly, if the inside diameter of the pipe in the pipeline is small, the flow rate is severely changed to cause the pressure variation width to be increased upon the generation of water hammer, and therefore, the appropriate pipe size and the longitudinal profile and protection mechanism for the safety upon the installation of the pipeline should be needed (the selection of appropriate pipeline installation and pipe inside diameter).

So as to reduce the water hammer, accordingly, a low speed rotary type screw valve, a valve using air or oil pressure have been developed under the studies continuously made in this field, but they have had other problems, thereby making it hard to conduct stable control. Accordingly, there is a need for the development of a new method for automatically recognizing water hammer and treating the recognized result.

A new water hammer recognizing and controlling method is disclosed in Korean Patent No. 742398 (prior art document 1) issued to the same applicant as this invention, wherein the level and pressure variations of an air chamber are compared with a single set value to recognize water hammer, so that whenever the water hammer is recognized, the on/off operations of an air compressor and an exhaust valve (solenoid valve) of the air chamber should be frequently conducted, which undesirably causes excessive energy consumption in a pipe system where a plurality of pumps are combined and controlled respectively in the on/off operations in accordance with the required capacity.

As mentioned above, the water hammer recognizing and controlling method is disclosed just in Korean Patent No. 742398 (prior art document 1) issued to the same applicant as this invention, and further, there have been disclosed Korean Patent No. 868908 (prior art document 2) wherein a single level of fluid in an air chamber is sensed to control a solenoid valve and an air compressor of a water hammer prevention system. Also, there have been disclosed Korean Patent No. 982683 (prior art document 3) wherein the pressures and levels of a plurality of air chambers are checked to control a water hammer prevention system. However, the prior art documents 2 and 3 do not have any function of recognizing water hammer, and one pressure and level of just one air chamber is sensed to control the water hammer prevention system, so that the control methods in the prior art documents 2 and 3 are excessively sensitive to the water hammer in recent pipe systems controlling the flow through the variable control of a plurality of pumps, thereby undesirably conducting the frequent on/off operations of the air compressor and the exhaust valve, in the same manner as mentioned in the prior art document 1.

DISCLOSURE

Technical Problem

Accordingly, the present invention has been made in view of the above-mentioned problems occurring in the prior art, and it is an object of the present invention to provide a water hammer recognizing and energy saving water hammer prevention system and a method for controlling the same that is configured wherein in case of the selective on/off operations of a plurality of pumps in a pipe system in accordance with the change of the use environment, the pressure variation and level variation of an air chamber caused by water hammer are compared with reference values and set values, and they are divided into a normal mode and a safe mode, thereby controlling the air intake and exhaust of the air chamber and preventing energy consumption from unnecessarily occurring.

Technical Solution

To accomplish the above object, according to the present invention, there is provided a water hammer recognizing and energy saving water hammer prevention system including: a plurality of contact switches or a level sensor part mounted inside an air chamber so as to sense a level variation and a pressure sensor part mounted inside the air chamber so as to sense a pressure variation; and a controller adapted to compare the level variation and the pressure variation with reference values and set values inputted through a control panel so as to recognize the occurrence of water hammer and thus to control an air compressor and an exhaust valve in accordance with the recognized result so as to reduce the water hammer in a main pipe, wherein under the control of the selective on/off operations of a plurality of pumps so as to control the capacity of the main pipe in accordance with the change of the use environment, if the pressure variation and the level variation sent from the pressure sensor part and the level sensor part are within the ranges of the reference values during set time, a normal mode is recognized through the controller, and if the pressure variation and the level variation are within the ranges of the set values during the set time, a safe mode is recognized through the controller, so that in case of the normal mode or the safe mode, the exhaust valve and the air compressor connected to the air chamber are operated to a set state, and in case of the deviation from the safe mode, if the pressure variation is higher than the set value and the water hammer is recognized by comparing pressure wave reaching time with the set time, the operation of the exhaust valve or the air compressor stops to adjust the pressure and level of the air chamber.

Advantageous Effects

According to the present invention, the water hammer recognizing and energy saving water hammer prevention system is configured wherein the pressure and level variations generated from the control of the on/off operations of the plurality of pumps in a pipe system in accordance with the change of the use environment are measured, and if the pressure variation is higher than a set value within set time, the occurrence of drastic water hammer is recognized to stop the operations of the air compressor and the exhaust valve and thus to conduct the protection of the pipe system protection and the generation of alarm sound, and the occurrence of general water hammer is divided into a normal mode and a safe mode, so that the operations of the air compressor and the exhaust valve are controlled to prevent them from being unnecessarily turned on/off repeatedly, thereby achieving energy saving and in real time preventing the water hammer by means of automatic feedback control, without having any responding time to the water hammer.

BEST MODE FOR INVENTION

Hereinafter, an explanation on a water hammer recognizing and energy saving water hammer prevention system according to the present invention will be in detail given with reference to the attached drawings.

According to the present invention, a water hammer recognizing and energy saving water hammer prevention system is configured wherein the water hammer generated from the selective on/off operations of a plurality of pumps in a pipe system in accordance with the change of the use environment is recognized through a pressure sensor part and a level sensor part mounted inside an air chamber, so that the activation of an air compressor and an exhaust valve is conducted under the division of a normal mode and a safe mode, thereby saving the energy consumed by the operation of the air chamber and effectively controlling the water hammer.

Figure 1:
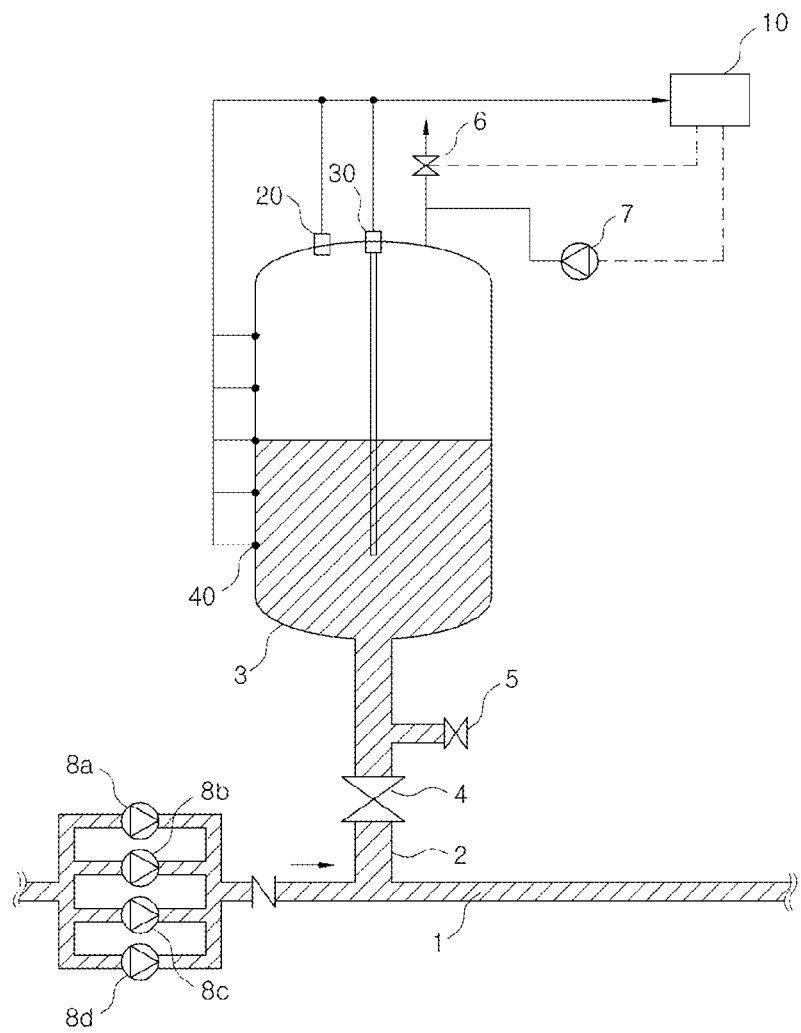
FIG. 1 is a schematic diagram showing a water hammer recognizing and energy saving water hammer prevention system according to the present invention.

As shown in FIG. 1, a water hammer prevention system according to the present invention is configured wherein a fluid flowing along a main pipe 1 is connected to an air chamber 3 through a connection pipe 2 on which a shut-off valve 4 and a drain valve 5 are mounted, and an exhaust valve 6 and an air compressor 7 are controlled in the air chamber 3 to reduce the water hammer of the main pipe 1.

That is, a plurality of pumps 8a, 8b, 8c, 8d is connected to the main pipe 1 and is selectively turned on and off in such a manner as to appropriately control the capacity of the main pipe 1 in accordance with the change of the use environment. Further, a check valve (with no reference numeral) is disposed at the rear ends of the pumps 8a, 8b, 8c, 8d.

For example, if it is assumed that the outputs of the pumps 8a, 8b, 8c, 8d are 50, 50, 100, 100 to cause the complement of the output of 300 in a pipe system to be needed, all of the pumps 8a, 8b, 8c, 8d are operated, and if the complement of the output of 150 in the pipe system is needed, only the pump 8a having the output of 50 and the pump 8c having the output of 100 are operated. Accordingly, the pressures in the pipe are varied in accordance with the on/off operations of the pipes 8a, 8b, 8c, 8d to change the pressure and level in the air chamber 3.

Further, the air chamber 3 includes a pressure sensor part 20 adapted to convert internal pressure variation therein into an electrical signal and thus to output the converted electrical signal and a level sensor part 30 adapted to sense the level of the fluid stored therein and thus to generate a given electrical signal from the sensed result, and the pressure variation and the level variation generated from the pressure sensor part 20 and the level sensor part 30 are sent to a controller 10.

At this time, the level variation can be measured by means of a plurality of contact switches 40 equally spaced apart from each other in a vertical direction at the inside of the air chamber 3 in such a manner as to generate the given electrical signal when the level of the fluid is sensed. However, the fluid stored in the air chamber 3 may be scattered upwardly due to drastically varied pressures, thereby undesirably causing the contact switches 40 to be malfunctioned, and accordingly, the contact switches 40 are desirably used together with the level sensor part 30.

The controller 10 compares reference values and set values inputted through a control panel (not shown in the drawing) by the manipulation of an operator with the pressure variation and the level variation transmitted from the pressure sensor part 20 and the level sensor part 30 and generates a given control signal in accordance with the compared result. In accordance with the control signal, next, the exhaust valve 6 or the air compressor 7 is operated to adjust the pressure and level of the air chamber 3.

At this time, the operating state of the system is visually outputted through a display (not shown) and stored in separate storing means, and further, if an emergent state occurs, an alarm sound may be generated.

According to the present invention, the occurrence of the water hammer is first determined by means of the pressure sensor part 20 for measuring the pressure variation $\Delta P$ at the inside of the air chamber 3 and secondarily determined by means of the level sensor part 30 for measuring the level variation $\Delta H$ at the inside of the air chamber 3.

According to the present invention, the pressure sensor part 20 is mounted at the upper portion (in the air) of the air chamber 3 and at the lower portion (in the fluid) of the air chamber 3, respectively, and if the pressure variation is generated due to the change of the level of the fluid in the air chamber 3, the pressure sensor part 20 converts the generated pressure variation into the electrical signal and sends the signal to the controller 10.

Further, the level sensor part 30 in real time checks the level variation $\Delta H$ of the fluid stored in the air chamber 3 through the contact switches 40 equally spaced apart from each other in a vertical direction at the inside of the air chamber 3 and generates the given electrical signal in accordance with the checked result to send the electrical signal to the controller 10. At this time, since one sides of the contact switches 40 are always contacted with the fluid to cause foreign matters to be formed on their surface portions, the contact switches 40 may be replaced with level measuring means such as level meters, photo sensors and the like.

On the other hand, the reference values Pr, Hr and the set values Ps, Hs on the pressure and level inputted to the controller 10 are determined in accordance with the pipe designs in the pipe system, and they include set time T during which a pressure wave reaches stable duration range.

The reference values Pr, Hr and the set values Ps, Hs are obtained by operating the data values like the bulk modulus of fluid, the modulus of elasticity of pipe, the inside diameter of pipe, the thickness of pipe through a mathematic expression well-known in this art in a pipe system designing step to calculate a pressure wave propagation speed a, and next by operating pressure wave reaching time $\mu$ through the pressure wave propagation speed a and the length L of pipe.

That is, if the pressure variation $\Delta P$ and the level variation $\Delta H$ sent from the pressure sensor part 20 and the level sensor part 30 are within the ranges of the reference values ±Pr, ±Hr during the set time T, a normal mode is recognized through the controller 10, and if the pressure variation $\Delta P$ and the level variation $\Delta H$ sent from the pressure sensor part 20 and the level sensor part 30 are within the ranges of the set values ±Ps, ±Hs during the set time T, a safe mode is recognized through the controller 10.

Accordingly, the occurrence of the water hammer is determined by means of the controller 10 through the pressure variation $\Delta P$ and the level variation $\Delta H$ sent from the pressure sensor part 20 and the level sensor part 30, and in accordance with the determined results, the exhaust valve 6 and the air compressor 7 are selectively operated to control the air chamber 3, thereby handling the water hammer.

For example, in case of the normal mode or the safe mode, the exhaust valve 6 and the air compressor 7 connected to the air chamber 3 are operated in accordance with the set values. In case of the deviation from the safe mode, if the pressure variation $\Delta P$ is higher than the set value Ps, the pressure wave reaching time $\mu$ is compared with the set time T. Thus, if the water hammer is recognized, the operation of the exhaust valve 6 or the air compressor 7 stops to adjust the pressure and level of the air chamber 3. At this time, the detailed technologies for controlling the air chamber 3 are well known in the art, and therefore, an explanation on them will be avoided for the brevity of the description.

Further, the output signals of the controller 10 include the current states (such as the pressure wave propagation speed, the pressure wave reaching time, the level variation $\Delta H$, the pressure variation $\Delta P$, water hammer occurrence date and time, system activation date and time, and the number of system activation times), and the current states are sent to the operator through a separate display (not shown). Upon the generation of water hammer, an alarm sound is generated to allow the emergent state to be recognized to the operator, and the current states are stored in real time in a separate storing part (not shown) to allow the problems of the system to be solved through the analysis of the data.

Figure 2:
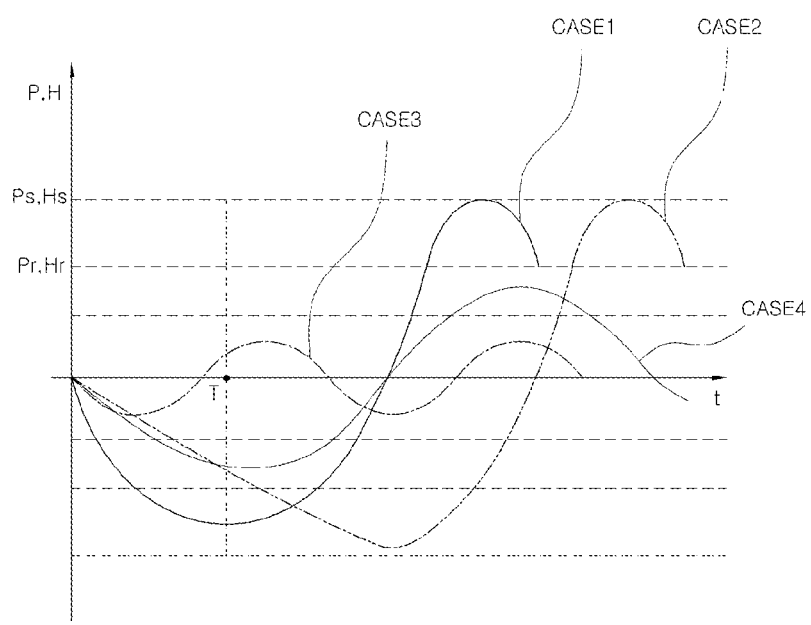
FIG. 2 is a waveform view showing the variations of pressure waves generated from the water hammer in the water hammer prevention system of FIG. 1.

According to the present invention, the division of the normal mode, the safe mode, and the water hammer will be more understood with reference to the graph of FIG. 2.

The pressure variation $\Delta P$ and the level variation $\Delta H$ are changed in accordance with time to form given waveforms, and in accordance with the inclination of each waveform formed by the pressure variation $\Delta P$ and the level variation $\Delta H$ with respect to the set time T, emergency stop water hammer, adjustable water hammer (safe mode), normal mode, and safe mode are dividable from each other.

For example, a case 1, in which an unsteady flow is recognized since the variation width is higher than the set value and the pressure wave reaching time is shorter than the reference time, indicates the generation of the water hammer not adjustable, and a case 2, in which an quasi-steady flow is recognized since the variation width is higher than the set value but the pressure wave reaching time is longer than the reference time, indicates the safe mode wherein the water hammer adjustable is generated. Further, a case 3, in which a steady flow is recognized since the variation width does not exceed the reference value, indicates the normal mode, and a case 4, in which a quasi-steady flow is recognized since the variation width exceeds the reference value but does not exceed the set value, indicates the safe mode.

Figure 3:
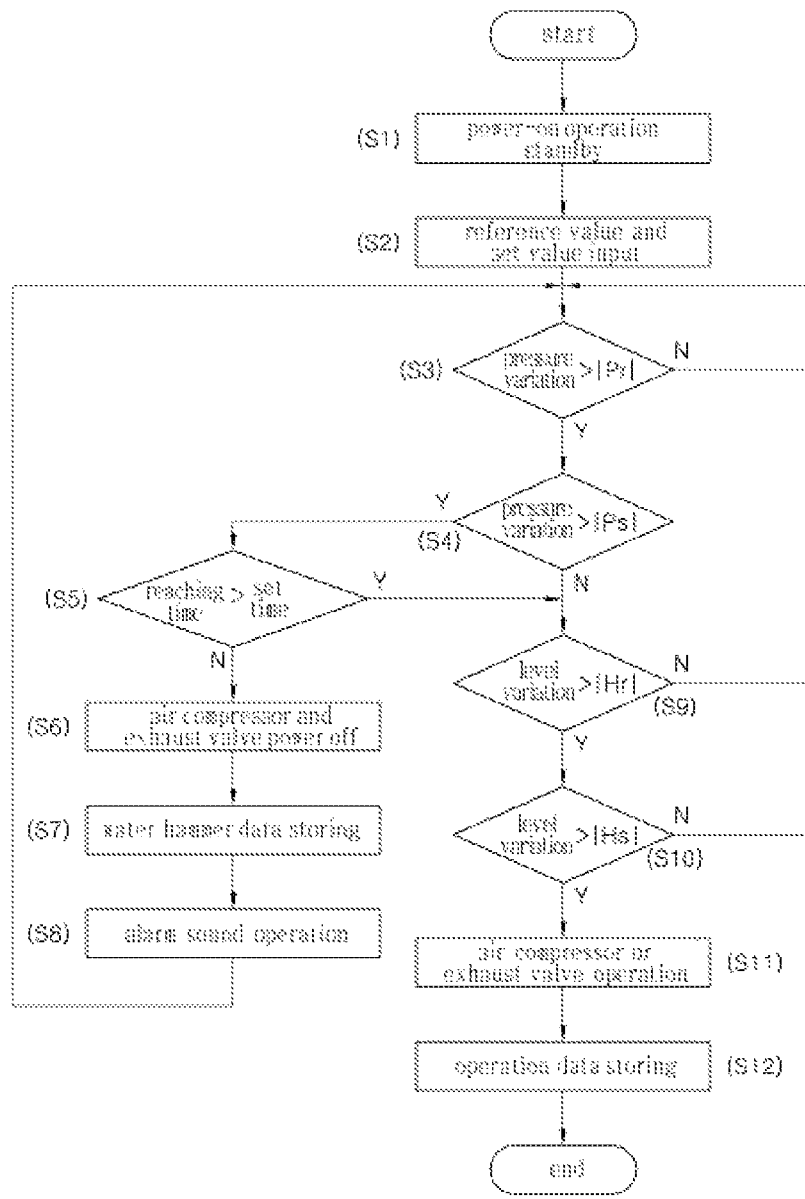
FIG. 3 is a flowchart showing a method for controlling the water hammer recognizing and energy saving water hammer prevention system according to the present invention.

On the other hand, a method for controlling the water hammer recognizing and energy saving water hammer prevention system according to the present invention is carried out through the flowchart as shown in FIG. 3, and in the control method, the water hammer is first determined in accordance with the pressure variation and secondarily determined in accordance with the level variation.

First, power is applied to conduct an operation stand-by step (S1) of the water hammer prevention system, and next, a step (S2) for inputting the reference values Pr, Hr, the set values Ps, Hs, and the set time T to the controller 10 is conducted by means of an operator.

After that, the pressure variation of the main pipe 1 and the air chamber 3 generated by the selective on/off operations of the plurality of pumps 8a, 8b, 8c, 8d is sensed by means of the pressure sensor part 20, and if the pressure variation is lower than the reference value |Pr|, a feedback step (S3) for returning to the step just before this step is conducted.

At this time, if the pressure variation of the air chamber 3 is higher than the reference value |Pr|, it is compared with the set value |Ps| again, and thus, if it is lower than the set value |Ps|, a feedback step (S4) for returning to the step just before the step (S3) is conducted. If the pressure variation of the air chamber 3 is higher than the set value |Ps|, the pressure wave reaching time μ and the set time T are compared to each other at a step (S5).

Also, if the pressure variation of the air chamber 3 is higher than the set value |Ps| and the pressure wave reaching time μ is shorter than the set time T, the occurrence of drastic water hammer in the pipe system is recognized to conduct a step (S6) of shutting off the application of the power to the exhaust valve 6 and the air compressor 7. Next, a step (S7) is conducted to store the data on the water hammer, and after that, a step (S8) is conducted to generate an alarm sound indicating the occurrence of water hammer.

Further, if the pressure variation of the air chamber 3 is higher than the set value |Ps| but the pressure wave reaching time μ is longer than the set time T, the occurrence of water hammer adjustable is recognized to check the level variation again.

That is, the level variation of the air chamber 3 sent from the level sensor part 30 is compared with the reference value |Hr|, and if it is lower than the reference value |Hr|, a feedback step (S9) for returning to the step just before the step (S3) is conducted. Further, if the level variation of the air chamber 3 is higher than the reference value |Hr|, it is compared with the set value |Hs| again, and thus, if it is lower than the set value |Hs|, a feedback step (S10) for returning to the step just before the step (S3) is conducted.

On the other hand, the level variation of the air chamber 3 is higher than the set value |Hs|, and if high level of fluid is recognized, the air compressor 7 is operated to inject air into the air chamber 3 to make the level of fluid decreased (S11). However, if low level of fluid is recognized, the exhaust valve 6 is open to exhaust the air in the air chamber 3 to make the level of fluid increased (S11). Next, a step (S12) is conducted to store the data on the operations of the exhaust valve 6 and the air compressor 7.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A water hammer recognizing and energy saving water hammer prevention system comprising:
   a plurality of contact switches or a level sensor part mounted inside an air chamber so as to sense a level variation ΔH and a pressure sensor part mounted inside the air chamber so as to sense a pressure variation ΔP; and
   a controller adapted to compare the level variation ΔH and the pressure variation ΔP with reference values ±Hr, ±Pr and set values ±Hs, ±Ps inputted through a control panel so as to recognize the occurrence of water hammer and thus to control an air compressor and an exhaust valve in accordance with the recognized result so as to reduce the water hammer in a main pipe,
   wherein under the control of the selective on/off operations of a plurality of pumps so as to control the capacity of the main pipe in accordance with the change of the use environment, if the pressure variation ΔP and the level variation ΔH sent from the pressure sensor part and the level sensor part are within the ranges of the reference values ±Pr, ±Hr during set time T, a normal mode is recognized through the controller, and if the pressure variation ΔP and the level variation ΔH are within the ranges of the set values ±Ps, ±Hs during the set time T, a safe mode is recognized through the controller, so that in case of the normal mode or the safe mode, the exhaust valve and the air compressor connected to the air chamber are operated to a set state, and in case of the deviation from the safe mode, if the pressure variation ΔP is higher than the set value Ps and the water hammer is recognized by comparing pressure wave reaching time μ with the set time T, the operation of the exhaust valve or the air compressor stops to adjust the pressure and level of the air chamber.

2. The water hammer recognizing and energy saving water hammer prevention system according to claim 1, wherein if the pressure variation ΔP is higher than the set value Ps and the pressure wave reaching time μ is shorter than the set time T, the occurrence of drastic water hammer is recognized through the controller to cause an alarm signal to be generated.

3. A method for controlling a water hammer recognizing and energy saving water hammer prevention system, the method comprising the steps of:
   (S1) applying power to the water hammer prevention system to conduct operation standby step of the water hammer prevention system;
   (S2) inputting reference values Pr, Hr and set values Ps, Hs to a controller;
   (S3) if the pressure variation of a main pipe and an air chamber generated by the selective on/off operations of a plurality of pumps is sensed by means of a pressure sensor part, comparing the pressure variation with the reference value |Pr|, and if the pressure variation is lower than the reference value |Pr|, returning to the step just before this step;
   (S4) if the pressure variation of the air chamber is higher than the reference value |Pr|, comparing the pressure variation with the set value |Ps |, and if the pressure variation is lower than the set value |Ps|, returning to the step just before the step (S3);
   (S5) if the pressure variation of the air chamber is higher than the set value |Ps|, comparing pressure wave reaching time μ and set time T;
   (S6) if the pressure wave reaching time μ is shorter than the set time T, recognizing the occurrence of drastic water hammer to shut off the application of the power to an exhaust valve and an air compressor;
   (S7) storing the data on the water hammer;
   (S8) generating an alarm sound indicating the occurrence of water hammer;
   (S9) if the pressure wave reaching time μ is longer than the set time T, comparing the level variation of the air chamber sent from a level sensor part with the reference value

|Hr|, and if it is lower than the reference value |Hr|, returning to the step just before the step (S3);

(S10) if the level variation of the air chamber is higher than the reference value |Hr|, comparing the level variation with the set value |Hs|, and if it is lower than the set value |Hs|, returning to the step just before the step (S3);

(S11) if the level variation of the air chamber is higher than the set value |Hs| and it is recognized as high level of fluid, operating the air compressor to inject air into the air chamber to make the level of fluid decreased, and if it is recognized as low level of fluid, opening the exhaust valve to exhaust the air in the air chamber to make the level of fluid increased; and (S12) storing the operation data on the operations of the exhaust valve and the air compressor.

\* \* \* \* \*